US009824084B2

(12) United States Patent
Zelenkov et al.

(10) Patent No.: US 9,824,084 B2
(45) Date of Patent: Nov. 21, 2017

(54) METHOD FOR WORD SENSE DISAMBIGUATION FOR HOMONYM WORDS BASED ON PART OF SPEECH (POS) TAG OF A NON-HOMONYM WORD

(71) Applicant: YANDEX EUROPE AG, Lucerne (CH)

(72) Inventors: Yury Grigorievich Zelenkov, Orekhovo-Zuevo (RU); Ilya Valentinovich Segalovich, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/516,102

(22) PCT Filed: Jun. 23, 2015

(86) PCT No.: PCT/IB2015/054710
§ 371 (c)(1),
(2) Date: Mar. 31, 2017

(87) PCT Pub. No.: WO2016/147034
PCT Pub. Date: Sep. 22, 2016

(65) Prior Publication Data
US 2017/0242846 A1    Aug. 24, 2017

(30) Foreign Application Priority Data

Mar. 19, 2015    (RU) ................. 2015109498

(51) Int. Cl.
G06F 17/27    (2006.01)
(52) U.S. Cl.
CPC ........ G06F 17/2785 (2013.01); G06F 17/271 (2013.01); G06F 17/274 (2013.01); G06F 17/2765 (2013.01)

(58) Field of Classification Search
None
See application file for complete search history.

(56) References Cited

U.S. PATENT DOCUMENTS 5,434,777 A    7/1995  Luciw
6,098,033 A    8/2000  Richardson et al.
(Continued)

FOREIGN PATENT DOCUMENTS

WO    2007103156 A2    9/2007

OTHER PUBLICATIONS

Dagan, Ido, and Alon Itai. "Word sense disambiguation using a second language monolingual corpus." Computational linguistics 20.4 (1994): 563-596.*
(Continued)

Primary Examiner — Jialong He
(74) Attorney, Agent, or Firm — BCF LLP

(57) ABSTRACT

A computer-implemented method of (600) and a system (222, 208) for processing a text stream. The method comprises accessing (602) the text stream; parsing (604) the text stream; analyzing (606) a first collection of words to identify a homonym candidate; generating (608) a homonym word pattern, the homonym word pattern comprising at least one word of the first collection of words; determining (610), for at least one word of the homonym word pattern, a first context element; generating (612) a homonym context pattern; analyzing (614) a second collection of words to identify a non-homonym candidate having a non-homonym context pattern at least partially matching the homonym context pattern, the non-homonym candidate being associated with a lexical tag; and assigning (616) the lexical tag associated with the non-homonym candidate to the homonym candidate.

18 Claims, 6 Drawing Sheets

(56) References Cited

U.S. PATENT DOCUMENTS

| | | | |
|---|---|---|---|
| 7,024,407 B2 | 4/2006 | Bradford | |
| 7,509,313 B2 | 3/2009 | Colledge et al. | |
| 7,634,403 B2 | 12/2009 | Roth et al. | |
| 7,672,833 B2 | 3/2010 | Blume et al. | |
| 7,729,901 B2 | 6/2010 | Richardson-Bunbury et al. | |
| 7,734,556 B2 | 6/2010 | Tan et al. | |
| 7,739,102 B2 | 6/2010 | Bender | |
| 7,899,666 B2 * | 3/2011 | Varone | G06F 17/2785 704/10 |
| 8,112,402 B2 | 2/2012 | Cucerzan et al. | |
| 8,205,155 B2 | 6/2012 | Trotter | |
| 8,359,190 B2 | 1/2013 | Kirshenbaum | |
| 8,510,408 B2 | 8/2013 | Rivers et al. | |
| 8,745,507 B2 | 6/2014 | Walton | |
| 8,751,218 B2 | 6/2014 | Dang et al. | |
| 8,751,306 B2 | 6/2014 | Burger et al. | |
| 2004/0246237 A1 | 12/2004 | Asakawa et al. | |
| 2005/0060150 A1 | 3/2005 | Li et al. | |
| 2005/0080613 A1 | 4/2005 | Colledge et al. | |
| 2006/0004571 A1 | 1/2006 | Ju et al. | |
| 2008/0015878 A1 | 1/2008 | Feng et al. | |
| 2008/0091411 A1 | 4/2008 | Williams | |
| 2009/0187399 A1 | 7/2009 | O'Dell | |
| 2010/0063796 A1 | 3/2010 | Rehberg et al. | |
| 2010/0153090 A1 | 6/2010 | Chen et al. | |
| 2011/0093256 A1 | 4/2011 | Williams | |
| 2011/0161068 A1 | 6/2011 | Lesher et al. | |
| 2011/0161073 A1 | 6/2011 | Lesher et al. | |
| 2012/0089400 A1 | 4/2012 | Henton | |
| 2013/0067062 A1 | 3/2013 | Gaitonde et al. | |
| 2013/0238762 A1 | 9/2013 | Raleigh et al. | |
| 2014/0188456 A1 | 7/2014 | Rylov et al. | |
| 2014/0244550 A1 | 8/2014 | Jin et al. | |
| 2014/0258301 A1 | 9/2014 | Misra et al. | |
| 2014/0297659 A1 | 10/2014 | Larsson et al. | |
| 2015/0178268 A1* | 6/2015 | Zuev | G06F 17/2785 704/9 |
| 2016/0357731 A1* | 12/2016 | Zorzin | G06F 17/2785 |

OTHER PUBLICATIONS

Ide, Nancy, and Jean Véronis. "Introduction to the special issue on word sense disambiguation: the state of the art." Computational linguistics 24.1 (1998): 2-40.*

Specia, Lucia, et al. "Word sense disambiguation using inductive logic programming." International Conference on Inductive Logic Programming. Springer Berlin Heidelberg, 2006.*

Karov, Yael, and Shimon Edelman. "Similarity-based word sense disambiguation." Computational linguistics 24.1 (1998): 41-59.*

International Search Report from PCT/IB2015/054710, dated Nov. 2, 2015, Young, Lee W.

Preliminary Report on Patentability from PCT/IB2015/054710, dated Jan. 22, 2016, Shah, Paras D.

Niavigli, Word Sense Disambiguation: A Survey, Universita di Roma La Sapienza, ACM Computing Surveys, vol. 41, No. 2, Article 10, Feb. 2009.

Lin, Automatic Retrieval and Clustering of Similar Words, Department of Computer Science, University of Manitoba, pp. 768-774.

de Cruys et al, Latent Semantic Word Sense Induction and Disambiguation, Proceedings of the 49th Annual Meeting of the Association for Computational Linguistics, pp. 1476-1485, Portland, Oregon, Jun. 19-24, 2011.

Niavigli et al., Inducing Word Senses to Improve Web Search Result Clustering, Dipartimento di Informatica, Sapienza Universit'a di Roma, 11 pages.

Chen et al, An Unsupervised Approach to Cluster Web Search Results based on Word Sense Communities, Department of Computing Science, University of Alberta, Canada, pp. 1-5.

Niavigli et al, An Experimental Study of Graph Connectivity for Unsupervised Word Sense Disambiguation, IEEE Transactions on Pattern Analysis and Machine Intelligence, vol. 32, 2010, pp. 1-15.

Niasiruddin, A State of the Art of Word Sensse Induction: A Way Towards Word Sense Disambiguation for Under-Resourced Languages,TALN-ReCITAL 2013, Jun. 17-21, Les Sables d'Olonne, pp. 192-205.

Segalovich et al., "Probabilistic model of morphological homonymy removal based on normalizing substitutions and positions of neighboring words", 2006.

Zelenkov et al., "Probabilistic model of morphological homonymy removal based on normalizing substitutions and positions of neighboring words", pp. 1-22.

* cited by examiner

METHOD FOR WORD SENSE DISAMBIGUATION FOR HOMONYM WORDS BASED ON PART OF SPEECH (POS) TAG OF A NON-HOMONYM WORD

CROSS-REFERENCE

The present application claims priority to Russian Patent Application No. 2015109498, filed Mar. 19, 2015, entitled "METHOD OF AND SYSTEM FOR PROCESSING A TEXT STREAM" the entirety of which is incorporated herein.

FIELD

The present technology relates to systems and methods for processing a text stream. In particular, the systems and methods aim at automatically assigning a lexical tag to a homonym word.

BACKGROUND

Human language is ambiguous. Whether in the English language, French language, Russian language or many other human languages, many words may be interpreted in multiple ways depending on the context in which they occur. Such words may be referred to as homonym words (also referred to as "homonym(s)"). As an example, the word "bank" in the English language may be associated with different meanings. As a first example, "if you want to buy a bicycle, you need to put the money in your piggy bank". As a second example, "the pilot must know how to bank the aircraft". In the first example, the word "bank" may be associated with a lexical tag "noun" and with a first meaning corresponding to a device used to store coins. In the second example, the word "bank" may be associated with a lexical tag "verb" and with a second meaning corresponding to causing an aircraft to modify its incline. Distinguishing the first meaning from the second meaning may be, in appearance, straight forward for human beings understanding the different contexts in which the word "bank" is used. While, most of the time, human beings may not even think about ambiguities which may be found in human languages, computer-implemented systems need to process unstructured textual information and transform it into data structures which may be analysed in order to determine an underlying meaning. Identification of meanings for words by computer-implemented systems is often referred to as Word Sense Disambiguation (or also referred to as "WSD").

WSD may be used in a multitude of contexts involving processing of text by computer-implemented systems. Such contexts may involve, for example, search engines, automatic translation, automatic training, content extraction and/or learning by computer-implemented systems.

SUMMARY

It is an object of present technology to provide improvements, in particular improvements aiming at improving automatic WSD of text by executing a method of processing a text stream and reducing the volume of data to be handled as a result of a reliance on a human-marked training corpora.

Embodiments of the present technology have been developed based on developers' appreciation of at least one shortcoming associated with the prior art.

Even though many studies and publications were made in the field of WSD, improvements as to how a homonym word is processed may be desirable. In particular, improvements aiming at reducing or eliminating the need for human-marked training corpora. As a person skilled in the art of the present technology may appreciate, generating human-marked training corpora may present multiple challenges as it typically requires highly trained individual having skills in linguistics to conduct highly repetitive tasks of tagging words of a text. In addition to the inherent risks of errors associated with manual tagging, costs for completing human-marked training corpora may be prohibitive, in particular for rarer human languages. Once generated, the human-marked training corpora is usually relied upon for at least some steps of computer-implemented methods processing text aiming at disambiguating words such as homonym words. In addition to the drawbacks previously set for in connection with the generation of such human-marked training corpora, computer-implemented methods of processing text to disambiguate words such as homonym words also present inherent limits. In particular, no matter how large the human-marked training corpora is, the methods may not always be able to find out, in the human-marked training corpora, a context relevant to at least some of the words it processes.

The present technology arises from an observation made by the inventor(s) that generating a homonym context pattern associated with a homonym identified in a text stream may be used to identify a non-homonym being associated with a non-homonym context pattern similar to the homonym context pattern. Once identified, a lexical tag associated with the non-homonym may then be assigned to the homonym thereby allowing, for example, automatically determining a meaning of the homonym which is more likely relevant to the particular context wherein the homonym is used. The present technology therefore allows assigning a lexical tag to a homonym indicative of its most likely meaning without having to rely on human-marked training corpora. The present technology may also allow be used to automatically generate training corpora which may then be used by conventional computer-implemented methods of WSD.

Thus, in one aspect, various implementations of the present technology provide computer-implemented method of processing a text stream, the method comprising:

accessing, from a non-transitory computer-readable medium, the text stream;

parsing the text stream by breaking the text stream down into a first collection of words;

analysing the first collection of words to identify a homonym candidate, the homonym candidate being associated with a first meaning and a second meaning;

generating a homonym word pattern, the homonym word pattern comprising at least one word of the first collection of words, the at least one word being selected based on a distance between the at least one word and the homonym candidate in the text stream;

determining, for at least one word of the homonym word pattern, a first context element;

generating a homonym context pattern, the homonym context pattern being at least partially based on the first context element;

analysing a second collection of words to identify a non-homonym candidate having a non-homonym context pattern at least partially matching the homonym context pattern, the non-homonym context pattern being at least partially based on a second context element determined for at least one word of a non-homonym word pattern, the non-homonym candidate being associated with a lexical tag; and assigning the lexical tag associated with the non-homonym candidate to the homonym candidate.

In some implementations, analysing the first collection of words to identify the homonym candidate is based on a comparison of each one of the words of the collection of words with entries of a dictionary database.

In some further implementations, analysing the first collection of words to identify the homonym candidate comprises accessing, from the non-transitory computer-readable medium, the dictionary database.

In some implementations, the homonym candidate is identified upon determining that one of the entries of the dictionary database corresponding to the one of the words of the first collection of words is associated with a plurality of meanings including the first meaning and the second meaning.

In some further implementations, the distance is a number of words separating the at least one word of the first collection of words from the homonym candidate in the text stream.

In some implementations, the distance is pre-defined as being at least one of one word before the homonym candidate, two words before the homonym candidate, three words before the homonym candidate, one word after the homonym candidate, two words after the homonym candidate and three words after the homonym candidate.

In some further implementations, the first context element and the second context element are at least one of an indication of a word form, an indication of a semantic characteristic and an indication of a grammatical characteristic.

In some implementations, generating the homonym context pattern is based on multiple context elements, each one of the multiple context elements being determined for the corresponding word of the homonym word pattern, the multiple context elements including the first context element.

In some further implementations, identification of the non-homonym candidate comprises determining that the second context element of the non-homonym context pattern is similar to the first context element of the homonym context pattern.

In some implementations, the lexical tag defines at least one of an indication of a word form, an indication of a semantic characteristic and an indication of a grammatical characteristic.

In some further implementations, the non-homonym candidate is associated with a unique meaning.

In some implementations, the method further comprises determining which one of the first meaning and the second meaning of the homonym candidate is to be retained based on the lexical tag assigned to the homonym candidate.

In some further implementations, determining which one of the first meaning and the second meaning of the homonym candidate is to be retained is completed without having to access to a training corpus of text manually tagged.

In some implementations, the text stream is a corpus of text.

In some further implementations, the method further comprises:

accessing, from the non-transitory computer-readable medium, a second text stream; and parsing the second text stream by breaking the second text stream down to establish the second collection of words.

In some implementations, the text stream and the second text stream define a same text stream.

In some further implementations, the first collection of words and the second collection of words define a same collection of words.

In some other aspect, various implementations of the present technology provide computer-implemented method of processing a text stream, the method comprising:

accessing, from a non-transitory computer-readable medium, the text stream;

parsing the text stream by breaking the text stream down into a first collection of words;

analysing the collection of words to identify a homonym candidate, the homonym candidate being associated with a first meaning and a second meaning;

generating a homonym word pattern, the homonym word pattern comprising at least one word of the collection of words, the at least one word being selected based on a distance between the at least one word and the homonym candidate in the text stream;

determining, for at least one word of the homonym word pattern, a first context element;

generating a homonym context pattern, the homonym context pattern being at least partially based on the first context element;

analysing a second collection of words to identify a non-homonym candidate having a non-homonym context pattern at least partially matching the homonym context pattern, the non-homonym context pattern being at least partially based on a second context element determined for at least one word of a non-homonym word pattern, the non-homonym candidate being associated with a lexical tag; and determining which one of the first meaning and the second meaning of the homonym candidate is to be retained based on the lexical tag associated with the non-homonym candidate.

In other aspects, various implementations of the present technology provide a non-transitory computer-readable medium storing program instructions for processing a text stream, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for processing a text stream, the program instructions being executable by one or more processors of the computer-based system to carry out one or more of the above-recited methods.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
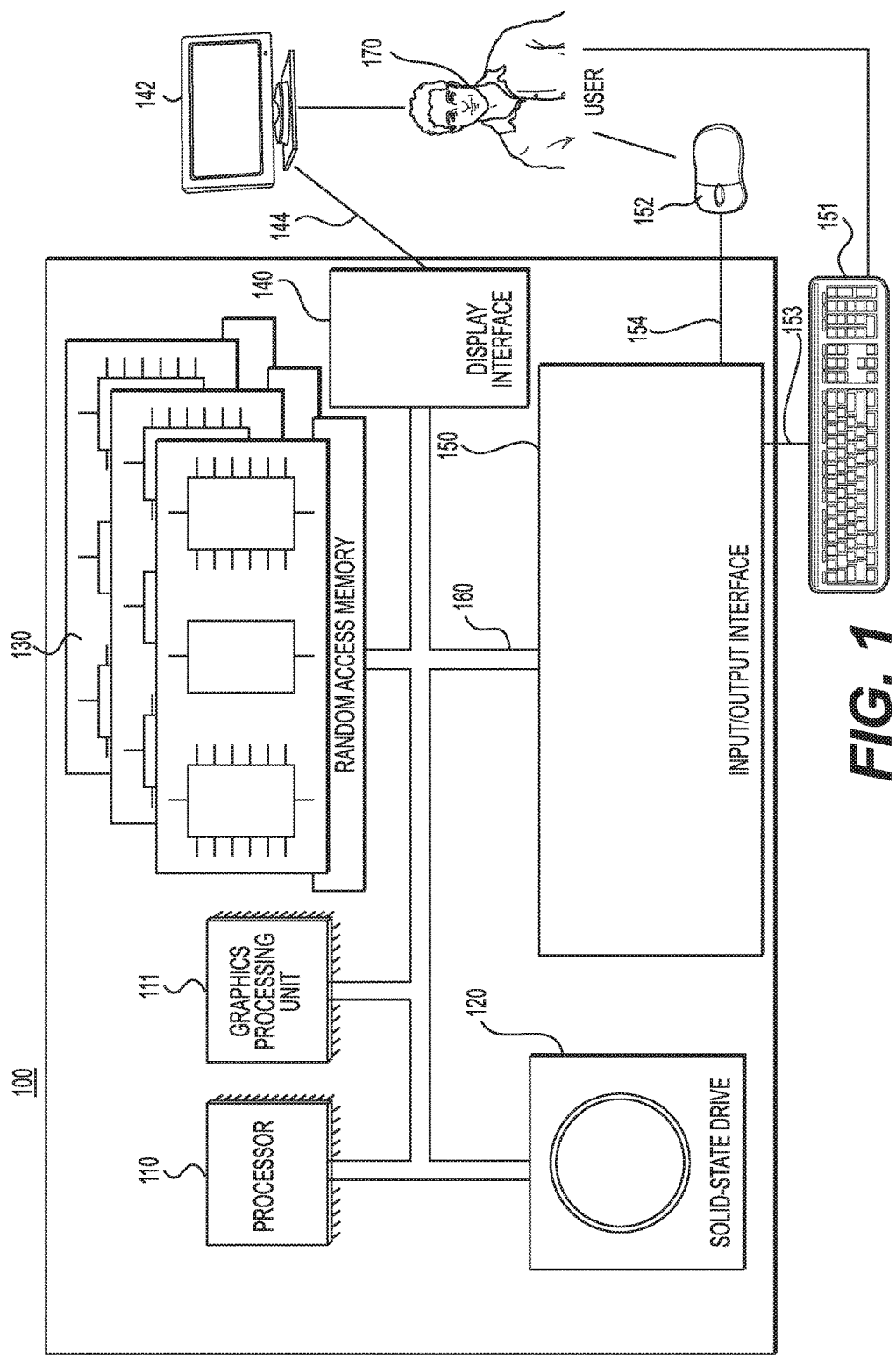
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing a text stream. For example, the program instructions may be part of a library or an application.

Figure 2:
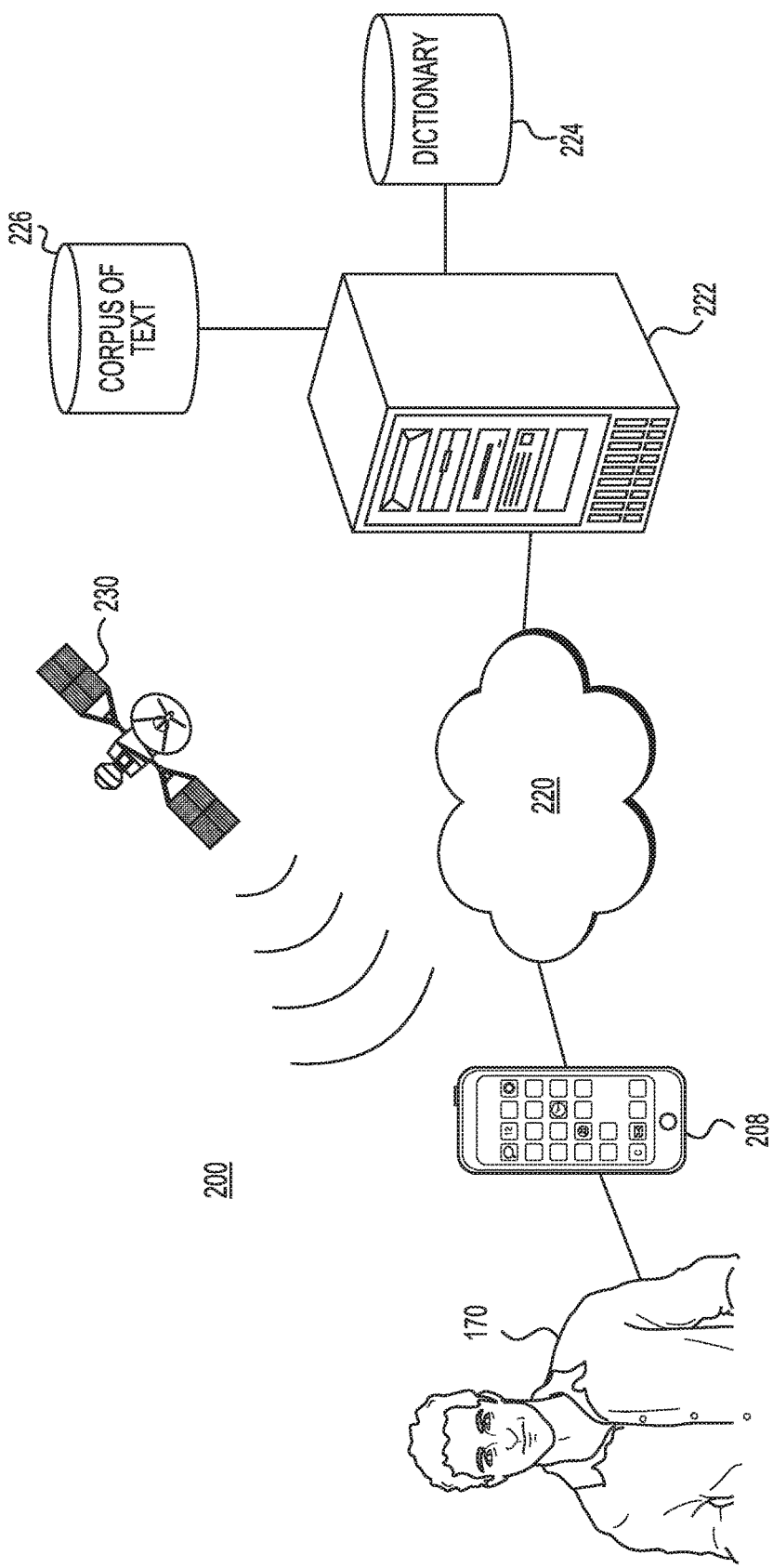
FIG. 2 is a diagram of a networked computing environment in accordance with an embodiment of the present technology.

In FIG. 2, there is shown a networked computing environment 200 suitable for use with some implementations of the present technology, the networked computing environment 200 comprising an electronic device 208 (also referred to as a "client device", an "electronic device" or an "electronic device associated with the user"), a server 222 (also referred to as a "remote server") in communication with the electronic device 208 via a network 220 (e.g., the Internet) enabling these systems to communicate and a GPS satellite 230 transmitting a GPS signal to the electronic device 208.

The implementation of the electronic device 208 is not particularly limited, but as an example, the electronic device 208 may interact with the server 222 by receiving input from the user 170 and receiving and transmitting data via the network 220. The electronic device 208 may be, for example and without being limitative, a desktop computer, a laptop computer, a smart phone (e.g. an Apple iPhone™ or a Samsung Galaxy S5™), a personal digital assistant (PDA) or any other device including computing functionality and data communication capabilities. The electronic device 208 may comprise internal hardware components including one or more single or multi-core processors collectively referred to herein as processor 110, a GPU 111 and a random access memory 130, each of which is analogous to the like-numbered hardware components of computer system 100 shown in FIG. 1, as well as a network interface (not depicted) for communicating with the server 222. The electronic device 208 may also comprise a GPS receiver (not depicted) for receiving a GPS signal from one or more GPS satellites, such as the satellite 230.

In one embodiment, the electronic device 208 displays content from the server 222 by processing data received from the server 222. In various embodiments, the electronic device 208 executes a visualisation interface to display content processed by the server 222 to the user 170 through a browser application (not shown) and/or through a dedicated visualisation application (not shown) preinstalled on the electronic device 208.

In an exemplary embodiment of the present technology, the visualisation interface may enable the user 170 to cause the server 222 to process a text stream. The text stream may be entered by the user 170 through the input/output interface 150 via, for example, the touchscreen of the electronic device 208, the keyboard 151 and/or the mouse 152. In some other embodiments, the text stream may be accessed by the server 222 from other servers and/or databases. Such databases may include a corpus of text database 226 (which will be described in more details below). The text stream may be accessed as a result of the user 170 interacting with the server 222 via the electronic device 208, or, alternatively, without any interactions of the user 170 with the server 222. As a person skilled in the art of the present technology will appreciate, as the present technology relates to the processing of text, multiple applications may be envisioned. Such applications may comprise, without being limitative, (i) generation of training corpora which may then be used by computer-implemented methods of WSD; (ii) computer-implemented methods of WSD which may or may not rely on training corpora; (iii) automatic translation of text; (iv) automatic processing of emails; (v) search engines; (vi) automatic content extraction; and (vii) automatic learning and training by computer-implemented systems. Multiple other applications may also be envisioned without departing from the scope of the present technology and are therefore not limitative.

As a result of the multiple applications which may be envisioned, the visualisation interface may, in some embodiments, take various forms such as, but without being limitative, a text translation interface, an email interface and/or a search engine interface.

In one embodiment, a communication channel (not depicted) between the electronic device 208 and the server 222 may be established to allow data exchange. Such data exchange may occur on a continuous basis or, alternatively, upon occurrence of certain events. For example, in the context of an automatic translation of the text stream, a data exchange may occur as a result of the user 170 selecting and/or entering the text stream, for example but without being limitative, by having the electronic device 208 sending a request to the server 222 and receiving in return a translation of the text stream.

As detailed above, in some embodiments, the communication channel may be created further to the electronic device 208 sending a request to process a text stream. In some other instances, the electronic device 208 may include a cookie (not shown) that contains data indicating whether the user 170 of the electronic device 208 is logged into the server 222. The cookie may indicate whether the user 170 is involved in an active session where the electronic device 208 exchanges data with the server 222, providing that the user 170 has an account associated with the server 222. Once the communication channel is established between the electronic device 208 and the server 222, data relating to the processed text stream may be received by the electronic device 208.

In some instances, a translated version of the text stream is received by the electronic device 208. In some other instances, training corpora or a training corpus is received by the electronic device 208 and then used by the electronic device 208 to conduct a translation. In some instances, only a lexical tag identifying the most likely meaning of a homonym is received by the electronic device 208. In yet some other instances, one or more entries from a dictionary database 224 (which will be described in more details below) are received by the electronic device 208. Determining whether the processed text stream, the translated version of the text stream, training corpora, the lexical tag and/or the one or more entries from the dictionary database 224 is to be received may be determined by the visualisation interface miming on the electronic device 208, the server 222 and/or the user 170 interacting with the electronic device 208. As a person skilled in the art of the present technology will appreciate, many variations as to how data is transferred between the electronic device 208 and the server 222 may be envisioned without departing from the scope of the present technology.

In another embodiment, the data relating to the text stream may be previously stored in a memory of the server 222 such as in the solid-state drive 120 and/or in the corpus of text database 226. In such an embodiment, no communication channel is to be established between the electronic device 208 and the server 222 as the data has been previously stored in the memory of the server 222 and/or in the corpus of text database 226. Naturally, even within those embodiments where the data relating to the text stream is stored in the memory of the server 222 and/or in the corpus of text database 226, the communication channel may be established (for example, to download updates and the like).

In yet another embodiment, the data relating to the text stream may be previously stored in a memory of the electronic device 208 such as in the solid-state drive 120. In another embodiment, entries of a dictionary may be previously stored in the memory of the electronic device 208. In such an embodiment, no communication channel is to be established between the electronic device 208 and the server 222 as the data has been previously stored in the memory of the electronic device 208, for example, upon downloading and installing the visualisation application on the electronic device 208. Naturally, even within those embodiments where the data relating to the text stream and/or entries of the dictionary are stored in the memory of the electronic device 208, the communication channel may be established (for example, to download updates and the like).

Once received by the electronic device 208 and/or accessed from the memory of the electronic device 208 and/or received by the server 222 and/or accessed from the memory of the server 222 and/or accessed from the corpus of text database 226 and/or accessed from the dictionary database 224, the data relating to the text stream and/or the one or more entries of the dictionary may be processed, for example by the processor 110 of the electronic device 208 and/or the processor 110 of the server 222. Instructions to carry out the processing of the data may be implemented through a software module controlled by the visualisation interface. Alternatively, the software module may be controlled independently from the visualisation interface (e.g., may be controlled by an operating system of the electronic device 208 and/or an operating system of the server 222). In other embodiments of the present technology, the instructions to carry out the processing may be implemented through a dedicated module (software and/or hardware) or a non-dedicated module (software and/or hardware) without departing from the scope of the present technology.

As it will be described with more details in the paragraphs below, the processing of data relating to the text stream aims at assigning a lexical tag indicative of a meaning to a homonym. In some other embodiments of the present technology, the processing of data relating to the text stream aims at determining a meaning of homonym out of a plurality of meanings. In some embodiments, the lexical tag and/or the determined meaning of the homonym may be stored in the memory of the electronic device 208 for immediate or later rendering on the display of the electronic device 208. In some embodiments, the lexical tag and/or the determined meaning of the homonym may be stored in the memory of the electronic device 208 for immediate or later processing by the electronic device 208, for example, but without being limitative, in the context of an automatic translation. In yet some other embodiments, the lexical tag and/or the determined meaning of the homonym may be stored in the memory of the server 222 for immediate or later processing by the server 222, for example, but without being limitative, in the context of an automatic translation.

The electronic device 208 is coupled to the network 220 via a communication link (not numbered). In some non-limiting embodiments of the present technology, the network can be implemented as the Internet. In other embodiments of the present technology, the network 220 can be implemented differently, such as any wide-area communications network, local-area communications network, a private communications network and the like.

How the communication link is implemented is not particularly limited and will depend on how the electronic device 208 is implemented. Merely as an example and not as a limitation, in those embodiments of the present technology where the electronic device 208 is implemented as a wireless communication device (such as a smart-phone), the communication link can be implemented as a wireless communication link (such as but not limited to, a 3G communications network link, a 4G communications network link, a Wireless Fidelity, or WiFi®, Bluetooth® and the like). In those examples, where the electronic device 208 is implemented as a notebook computer, the communication link can be either wireless (such as the Wireless Fidelity, or WiFi®, Bluetooth® and the like) or wired (such as an Ethernet based connection).

It should be expressly understood that implementations for the electronic device 208, the communication link and the network 220 are provided for illustration purposes only. As such, those skilled in the art will easily appreciate other specific implementational details for the electronic device 208, the communication link and the network 220. As such, by no means, examples provided herein above are meant to limit the scope of the present technology.

Also coupled to the network 220 is the server 222 on which a service for processing the text stream may be hosted. The server 222 can be implemented as a conventional computer server. In an example of an embodiment of the present technology, the server 222 can be implemented as a Dell™ PowerEdge™ Server running the Microsoft™ Windows Server™ operating system. Needless to say, the server 222 can be implemented in any other suitable hardware and/or software and/or firmware or a combination thereof. In the depicted non-limiting embodiment of present technology, the server 222 is a single server. In alternative non-limiting embodiments of the present technology, the functionality of the server 222 may be distributed and may be implemented via multiple servers.

The implementation of the server 222 is well known to the person skilled in the art of the present technology. However, briefly speaking, the server 222 comprises a communication interface (not depicted) structured and configured to communicate with various entities (such as the electronic device 208, for example and other devices potentially coupled to the network 220) via the network 220. The server 222 further comprises at least one computer processor (not depicted) operationally connected with the communication interface and structured and configured to execute various processes to be described herein.

The server 222 may be communicatively coupled (or otherwise has access) to a server implementing a search engine (not shown). In some embodiments, the server 222 may implement or be coupled to a server implementing generation of training corpora which may then be used by computer-implemented methods of WSD. In some other embodiments, the server 222 may implement or be coupled to a server implementing computer-implemented methods of WSD which may or may not rely on training corpora. In some embodiments, the server 222 may implement or be coupled to a server implementing automatic translation of text, automatic processing of emails, search engines and/or automatic content extraction. The server 222 can be sometimes referred to as a "text processing server", a "data server", a "training corpora generating server", a "Word Sense Disambiguation server", a "WSD server", a "translation server", an "email server", a "search server" or a "content extraction server".

The general purpose of the server 222 is to process a text stream to assign a lexical tag which may be indicative of a meaning to a homonym. What follows is a description of one non-limiting embodiment of the implementation for the server 222. However, it should be understood that there is a number of alternative non-limiting implementations of the server 222 possible. It should be also expressly understood that in order to simplify the description presented herein below, the configuration of the server 222 has been greatly simplified. It is believed that those skilled in the art will be able to appreciate implementational details for the server 222 and for components thereof that may have been omitted for the purposes of simplification of the description.

Generally speaking the purpose of the server 222 is to (i) receive a request to process a text stream; (ii) retrieve data from the corpus of text database 226 and/or the dictionary database 224; (iii) process the text stream to assign a lexical tag indicative of a meaning to a homonym; and (iv) transmit and/or store the lexical tag. How the server 222 is configured to receive the request, retrieve data and transmit data is not particularly limited. Those skilled in the art will appreciate several ways and means to execute the receiving of the request, the retrieving of the data and the transmitting of the data and as such, several structural components of the server 222 will only be described at a high level. More details regarding how the text stream is processed will be provided in connection with the description of FIGS. 3 to 6.

In one embodiment, the server 222 may be configured to receive a request from the electronic device 208 specifically identifying a text stream to be processed. In another embodiment, the request may also comprise the text stream or a portion of the text stream. In some embodiments the request may also identify a specific dictionary to be used upon processing the text stream, such as the dictionary database 224. In an alternative embodiment of the present technology, the request received from the electronic device 208 may be a search query which is interpreted and processed by a search engine that may be, for example, hosted on the server 222. Once processed, an identification of data required to process the text stream may occur. In an embodiment, the identification of the data may be conducted by accessing the corpus of text database 226. How the data is identified is not particularly limited.

Once the data is identified, the server 222 then retrieves the data from the corpus of text database 226 and/or the dictionary database 224, as the case may be and/or as the need may be. The retrieved data may include a text stream, a portion of a text stream and/or one or more entries of a dictionary. In some embodiments of the present technology, the retrieved data may be processed by the server 222 to assign a lexical tag indicative of a meaning to a homonym. In some embodiments, the lexical tag may be transmitted to the electronic device 208. In some other embodiments, the lexical tag may be stored in a memory of the server 222 and/or the corpus of text database 226.

The dictionary database 224 is communicatively coupled to the server 222 and may comprise data representing one or more entries of a dictionary. How the dictionary database 224 is structured is not particularly limitative and many variations may become apparent to a person skilled in the art of the present technology. In one embodiment, the dictionary database 224 may comprise data structured so as to contain information similar to the information detailed in dictionary entries 302, 304, 402, 404, 502 and/or 504. As an example, the dictionary entry 302 relates to a word "right". As a person skilled in the art of the present technology will appreciate, the dictionary entry 302 comprises multiple meanings associated with the word "right". Therefore, the word "right" may qualify as being a homonym (also referred to as a "homonym word" or a "homonym candidate") as it is associated with more than one meaning, and, in this example, multiple linguistic characteristics. In an exemplary embodiment, such as the one detailed in FIG. 3, the multiple meanings may be categorized according to certain linguistic characteristics. In an embodiment, the linguistic characteristics may be a word form, a semantic characteristic and/or a grammatical characteristic. Other linguistic characteristics may be equally used without departing from the scope of the present technology. In some embodiments, an identifier of one or more linguistic characteristics may be referred to as a lexical tag and are therefore not limitative. As an example, the dictionary entry 302 is associated with multiple lexical tags, namely a lexical tag 306 associated with the linguistic characteristic "Adjective", a lexical tag 308 associated with the linguistic characteristic "Adverb", a lexical tag 310 associated with the linguistic characteristic "Noun" and a lexical tag 312 associated with the linguistic characteristic "Verb". As another example, the dictionary entry 304 relates to the word "represent". As a person skilled in the art of the present technology will appreciate, the dictionary entry 304 comprises one meaning associated with the word "represent". Therefore, the word "represent" may qualify as being a non-homonym (also referred to as a "non-homonym word" or a "non-homonym candidate") as it is associated with only one meaning, and, in this example, only one linguistic characteristic. Still under this example, the dictionary entry 304 is associated with a lexical tag 314 associated with the linguistic characteristic "Verb".

As a result of the lexical tags associated with the dictionary entries, it may become possible to determine whether a word is a homonym or is a non-homonym. In an exemplary embodiment, the processor 110, upon processing the text stream may determine that a word is associated with multiple lexical tags and/or multiple meanings and/or multiple linguistic characteristics and therefore qualifies as being a homonym. Conversely, in another exemplary embodiment, the processor 110, upon processing the text stream may determine that a word is associated with one lexical tag and/or one meaning and/or one linguistic characteristic and therefore qualifies as being a non-homonym.

As a person skilled in the art of the present technology will appreciate, the dictionary database 224 may comprise multiple dictionary entries to define a complete dictionary for a given human language. However, in some alternative embodiments, the dictionary database may be limited to a certain number of dictionary entries to define a partial dictionary, for example in the context of a technical dictionary associated with a specific field such as, but without being limitative, a legal dictionary, a scientific dictionary and the like. In some other embodiments, the dictionary database 224 may be coupled to Internet resources comprising data accessible to generate dictionary entries. In yet some other embodiments, the dictionary database 24 may be replaced by the server 222 accessing Internet resources comprising data accessible to generate dictionary entries. For example, and without being limitative, such Internet resources may be online dictionaries such as "Dictionary.com" available dictionary.reference.com at or "Larousse" available at www-.larousse.com. In addition, as a person skilled in the art of the present technology will appreciate, the language of the word associated with the dictionary entries of the dictionary database 224 and/or the Internet resources is not limitative. Such language may comprise, for example, the English language (such as for the dictionary entries 302 and 304), the French language (such as for the dictionary entries 402 and 404), the Russian language (such as for the dictionary entries 502 and 504). Other human languages or human dialects may be equally used.

Still referring to FIG. 2, we shall now describe the corpus of text database 226. The corpus of text database 226 is communicatively coupled to the server 222 and may comprise data representing one or more corpora of text. How the corpus of text database 226 is structured is not particularly limitative and many variations may become apparent to a person skilled in the art of the present technology. In one embodiment, corpus of text database 226 comprises a collection a text segments also referred to a text stream. The text stream consists of one or more lines of text that may be processed by a computer-implemented system, for example, but without being limitative, by the electronic device 208 and/or the server 222. The text stream may comprise one or more words. The number of words which may be comprised by the text stream may be unlimited. The text stream may be implemented according to various conventions as long as the text stream remains in a format which may be processed by a computer-implemented system. In some embodiments, the text stream is in a "raw" text format and has not been previously processed by a method of processing text. In some other embodiments, the text stream may have been previously tagged by automatically and/or manually associating lexical tags with at least some of the words of the text stream. In some embodiments, the corpus of text database 226 may store the text stream or a portion of the text stream to be processed in accordance with the present technology. In some other embodiments the text stream or the portion of the text stream may be provided via other means, such as for example, but without being limitative, via the electronic device 208 or may be accessed from other resources such as Internet resources. In such embodiments, the server 222 may pull a text stream from an Internet resource (e.g., a content service) as a result of an instruction to do so issued by the electronic device 208 and/or issued by the server 222.

In some embodiments, the corpus of text database 226 may also be used to store data generated further to the processing of a stream of text according to the present technology. Such data may include lexical tags associated with homonyms. Such data may then be used by the server 222 and/or other computer-implemented systems implementing computer-implemented methods of WSD which may or may not rely on training corpora. In some embodiments, the server 222 and/or the other computer-implemented systems may implement automatic translation of text, automatic processing of emails, search engines and/or automatic content extraction.

Figure 3:
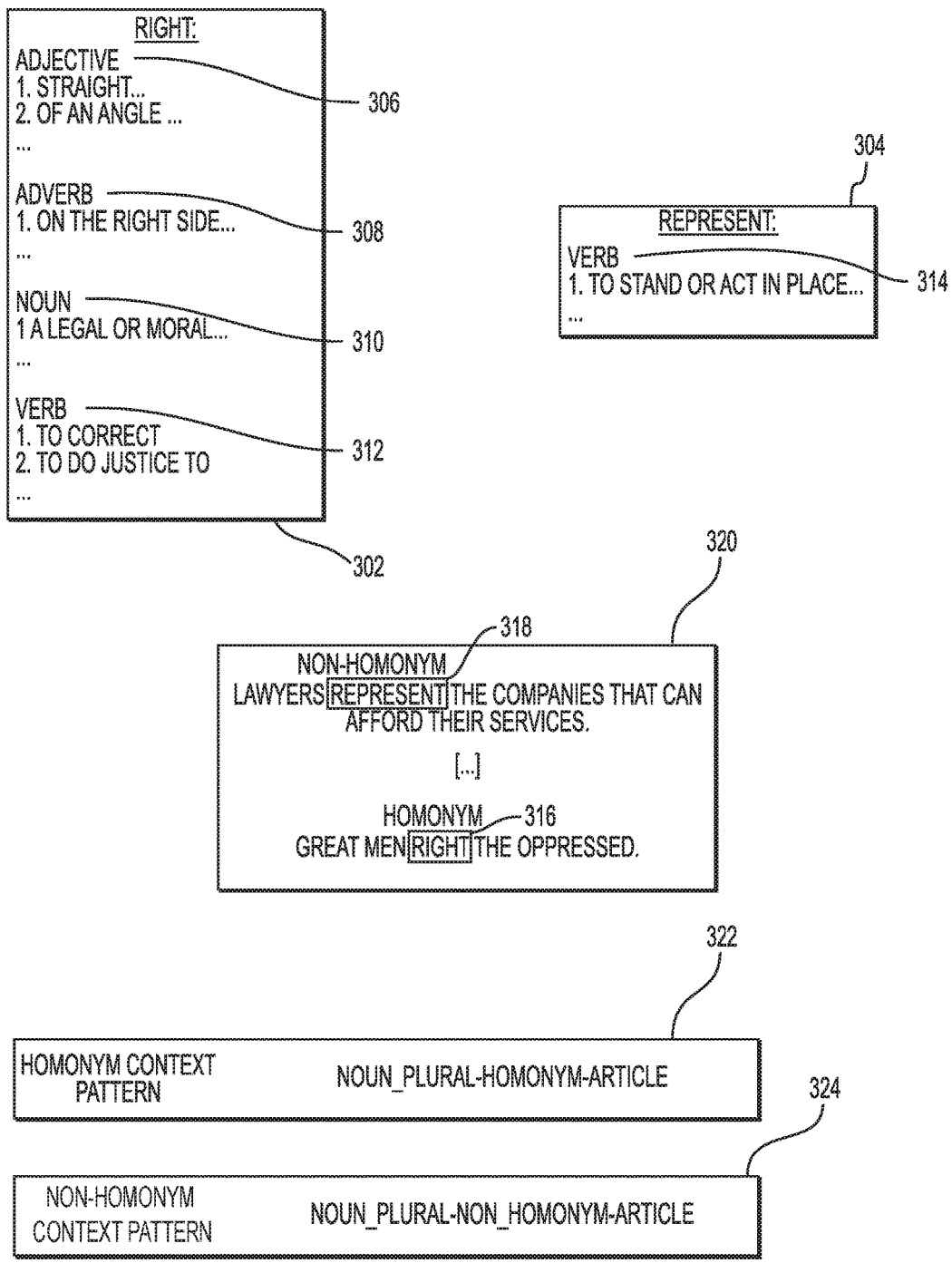
FIG. 3 is a diagram illustrating a text stream in the English language and other related data processed in accordance with an embodiment of the present technology.

Turning now to FIG. 3, an example of a text stream 320 in the English language is shown. The text stream 320 comprises two sentences, a first sentence "Lawyers represent the companies that can afford their services." and a second sentence "Great men right the oppressed." In some embodiments, each one of the two sentences may be comprised in distinct text streams. The distinct text streams may or may not be accessed from a same resource. In one example, the first sentence may be accessed by the server 222 from the corpus of text database 226 and the second sentence may be received by the server 222 from the electronic device 208. How the text stream is divided and from where the text stream or portions of the text stream may be accessed from are not limitative and multiple variations are possible without departing from the scope of the present technology.

In accordance with an aspect of the present technology, the text stream 320 may be accessed from the corpus of text database 226 by the server 222 which implements the method of processing the text stream 320. Once accessed by the server 222, the text stream 320 is parsed into a collection of words (equally referred to as a "plurality of words" or "multiple words"). In an embodiment, parsing the text stream 320 may comprise breaking down the text stream 320 into a collection of words. As an example, the second sentence of the text stream 320 may be broken down into the following collection of words "Great", "men", "right", "the", "oppressed". The collection of words is then analysed to identify a homonym. The analysis may comprise accessing the dictionary database 224. For example, upon processing the word "right", the server 222 may determine that the word "right" is associated with a dictionary entry 302 which comprises more than one lexical tag. In this example, the word "right" is associated with the lexical tags 306, 308, 310 and 312. As a result, the server 222 may determine that the word "right" is associated with at least a first meaning and a second meaning and as a result shall be identified as a homonym (also referred to as a "homonym word" or a "homonym candidate"). In the example illustrated at FIG. 3, the word "right" is referred to as the homonym 316. The server 222 may then generate a homonym word pattern associated with the homonym "right". In an embodiment, the homonym word pattern comprises one or more words from the collection of words. The one or more words may be selected based on a distance between the one or more words and the homonym. In an embodiment, the distance may be one word before the homonym, two words before the homonym, three words before the homonyms, one word after the homonym, two words after the homonym or three words after the homonyms. Other variations will become apparent to the person skilled in the art of the present technology and are therefore not limitative. As an example, a homonym word pattern associated with "right" may comprise "men" (i.e., one word before) and "the" (i.e., one word after). In some embodiments, the homonym word pattern may comprise the homonym word to form the following homonym word pattern "men"-"right"-"the".

Then, the server 222 may determine for one or more words of the homonym word pattern a first context element. In an embodiment, determining the first context element may comprise determining a "transforming function", the transforming function being indicative of how many letters within the one or more words need to be changed and to what the letters need to be changed to render a specific form of the one or more words. In an exemplary embodiment, the specific form may be an infinitive form. As an example, the transforming function may be <3/e> and may be indicative of three last letters of a word needed to be changed to "e" to obtain an infinitive form of the word. In an example, the word may be "gliding" and the transforming function applied to the word would result in its infinitive form "glide". Other variations of determining the first context element may be equally used without departing from the scope of the present technology. In some embodiments, determining the first context element may result in determining a word form, a semantic characteristic and/or a grammatical characteristic. As an example, the server 222 may determine the first context element associated with the word "men" as being "Noun_Plural" indicative of the plural form of the noun "man". As another example, a context element associated with the word "the" as being "Article" indicative of a characteristic of the word "the". In some embodiments of the present technology, determining the context element associated with a word may be, at least partially, based on entries of the dictionary database 224.

Based on the first context element, the server 222 may generate a context pattern (also referred to as a "homonym context pattern"). In some embodiments, the context pattern is based on more than one context element and may or may not include the homonym word or an indication that the homonym word is a homonym. As an example, the context pattern 322 is generated. The homonym context pattern 322 comprises two context elements and an indication that the homonym is a homonym. The homonym context pattern 322 therefore recites "Noun-Plural-Homonym-Article". In an embodiment, the homonym context pattern 322 is associated with the homonym—i.e., the word "right".

In some embodiments, the server 222 analyses the collection of words and/or another collection of words generated from a same or different text stream. In an example, the other collection of words may be generated further to parsing a text corpus accessed from the corpus of text database 226. Analysing the collection of words and/or the other collection of words may aim at identifying a non-homonym (also referred to as a "non-homonym word" or a "non-homonym candidate") from the collection of words, the non-homonym word having at least one context element associated with its non-homonym context pattern corresponding with the first context element associated with the homonym context pattern. In some embodiments, the closest non-homonym to the homonym having the most similar non-homonym context pattern compared to the homonym context pattern is selected. In some other examples, the non-homonym sharing the most similarities between its non-homonym context pattern and the homonym context pattern is selected. As an example, the collection of words used by the server 222 may be "Lawyers", "represent", "the", "companies", "that", "can", "afford", "their" and "services". From this collection of words, the server 222 may determine, for example based on the dictionary entry 304, that the word "represent" is a non-homonym as it is associated with only one lexical tag, the lexical tag 314 corresponding to "Verb". In the example illustrated at FIG. 3, the word "represent" is referred to as the non-homonym 318. Still pursuing with this example, a context pattern associated with the non-homonym "represent" may comprise one or more context elements such as the context element "Noun-Plural" associated with the word "Lawyers". In some embodiments, the non-homonym context pattern may be generated in a similar fashion than the homonym context pattern, for example based on a non-homonym word pattern similar to the homonym word pattern. In some embodiments, the non-homonym context pattern is based on more than one context element and may or may not include the non-homonym word or an indication that the non-homonym word is a non-homonym. As an example, the non-homonym context pattern 324 is generated. The non-homonym context pattern 324 comprises two context elements and an indication that the non-homonym is a non-homonym. The non-homonym context pattern 324 therefore recites "Noun-Plural-Non_Homonym-Article". In an embodiment, the non-homonym context pattern 324 is associated with the non-homonym—i.e., the word "represent". Then, because the non-homonym context pattern 324 matches the homonym context pattern 322, the server 222 may assign the lexical tag 314 (i.e., "Verb") to the homonym 316. In some embodiments, the lexical tag 314 is assigned to the homonym 316 in the particular context of the homonym 316 used in the text stream. In some alternative embodiments, the non-homonym context pattern 324 may only partially match the homonym context pattern 322 for the server 222 to assign the lexical tag 314. As a result, the server 222 may identify a meaning of the homonym 316 which is most likely relevant to the context of the homonym. In the example, the lexical tag 314 assigned to the homonym 316 may be stored in a memory of the server 222 and/or the corpus of text database 226. The lexical tag 314 may then be used by the server 222 and/or other computer-implemented systems implementing computer-implemented methods of WSD which may or may not rely on training corpora. In some embodiments, the lexical tag 314 may then be used in the for purposes automatic translation of text, automatic processing of emails, search engines and/or automatic content extraction.

Figure 4:
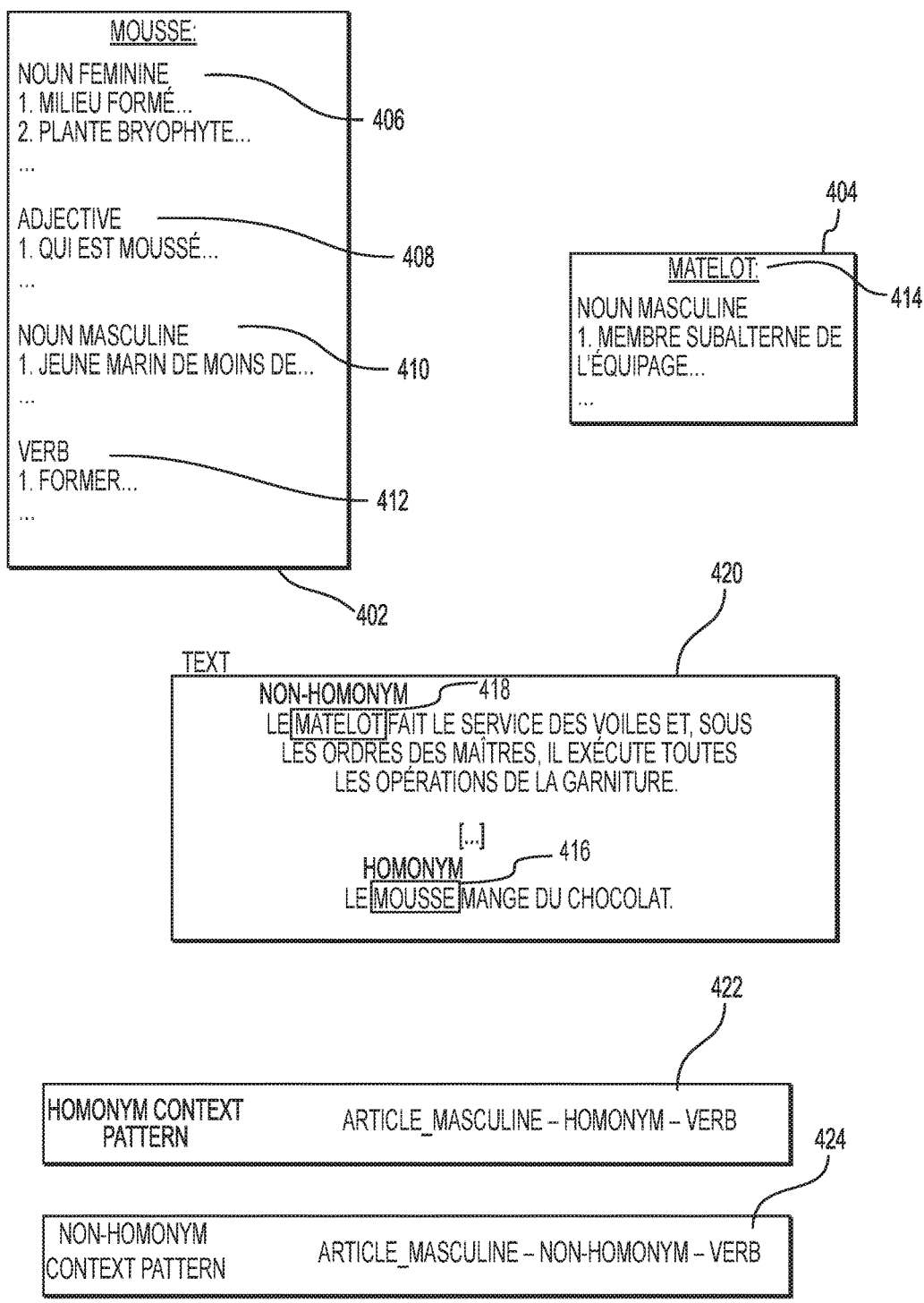
FIG. 4 is a diagram illustrating a text stream in the French language and other related data processed in accordance with an embodiment of the present technology.

Turning now to FIG. 4, an example of a text stream 420 in the French language is shown. The text stream 420 comprises two sentences, a first sentence "Le matelot fait le service des voiles et, sous les ordres des maîtres, il exécute toutes les opérations de la garniture." and a second sentence "Le mousse mange du chocolat.". As an example, the second sentence of the text stream 420 may be broken down into the following collection of words "Le", "mousse", "mange", "du", "chocolat". For example, upon processing the word "mousse", the server 222 may determine that the word "mousse" is associated with a dictionary entry 402 which comprises more than one lexical tag. In this example, the word "mousse" is associated with the lexical tags 406, 408, 410 and 412. As a result, the server 222 may determine that the word "mousse" is associated with at least a first meaning and a second meaning and as a result shall be identified as a homonym (also referred to as a "homonym word" or a "homonym candidate"). In the example illustrated at FIG. 4, the word "mousse" is referred to as the homonym 416. As an example, a homonym word pattern associated with "mousse" may comprise "Le" (i.e., one word before) and "mange" (i.e., one word after). In some embodiments, the homonym word pattern may comprise the homonym word to form the following homonym word pattern "Le"-"mousse"-"mange".

As an example, the server 222 may determine the first context element associated with the word "Le" as being "Article_Masculine". The homonym context pattern 422 comprises two context elements and an indication that the homonym is a homonym. The homonym context pattern 422 may therefore recite "Article_Masculine-Homonym-Verb". Turning now to the first sentence used in that example to determine the lexical tag to be assigned to the homonym 416, the collection of words used by the server 222 may be "Le", "matelot", "fait", "le", "service", "des", "voiles", "et", ",", "sous", "les", "ordres", "des", "maîtres", ",", "il", "exécute", "toutes", "les", "operations", "de", "la" and "garniture". From this collection of words, the server 222 may determine, for example based on the dictionary entry 404, that the word "matelot" is a non-homonym as it is associated with only one lexical tag, the lexical tag 414 corresponding to "Noun Masculine". In the example illustrated at FIG. 4, the word "matelot" is referred to as the non-homonym 418. Still pursuing with this example, a context pattern associated with the non-homonym "matelot" may comprise one or more context elements such as the context element "Article_Masculine" associated with the word "Le".

As an example, the non-homonym context pattern 424 is generated. The non-homonym context pattern 424 comprises two context elements and an indication that the non-homonym is a non-homonym. The non-homonym context pattern 424 therefore recites "Article_Masculine-Non_Homonym-Verb". In an embodiment, the non-homonym context pattern 424 is associated with the non-homonym—i.e., the word "matelot". Then, because the non-homonym context pattern 424 matches the homonym context pattern 422, the server 222 may assign the lexical tag 414 (i.e., "Noun Masculine") to the homonym 416. As a result, the server 222 may identify a meaning of the homonym 416 which is most likely relevant to the context of the homonym.

Figure 5:
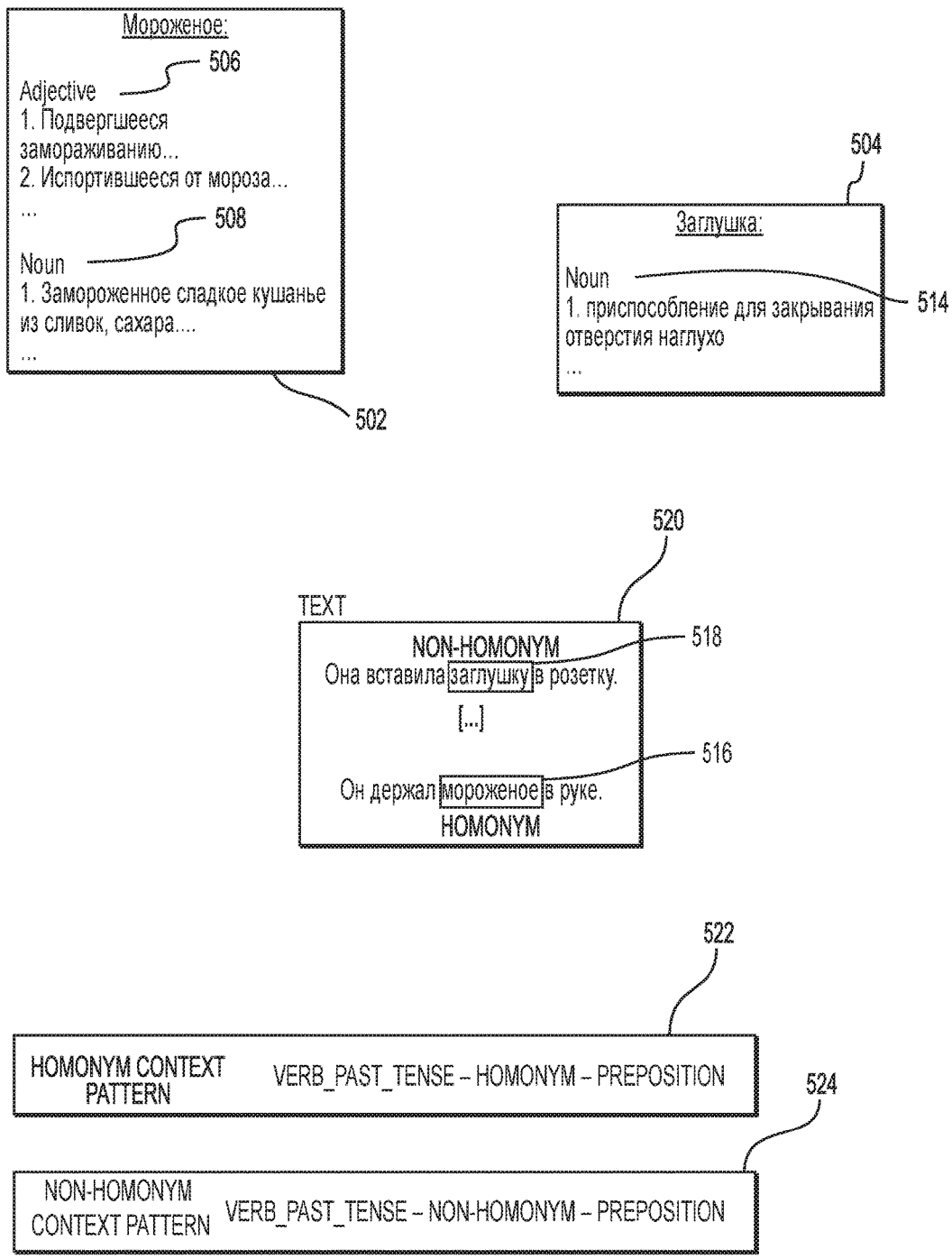
FIG. 5 is a diagram illustrating a text stream in the Russian language and other related data processed in accordance with an embodiment of the present technology.

Turning now to FIG. 5, an example of a text stream 520 in the Russian language is shown. The text stream 520 comprises two sentences, a first sentence "Она вставила заглушку в розетку ." and a second sentence "Он держал мороженое в руке .". As an example, the second sentence of the text stream 520 may be broken down into the following collection of words "Он ", " держал ", " мороженое ", " в ", " руке ". For example, upon processing the word " мороженое ", the server 222 may determine that the word " мороженое " is associated with a dictionary entry 502 which comprises more than one lexical tag. In this example, the word " мороженое " is associated with the lexical tags 506 and 508. As a result, the server 222 may determine that the word " мороженое " is associated with at least a first meaning and a second meaning and as a result shall be identified as a homonym (also referred to as a "homonym word" or a "homonym candidate"). In the example illustrated at FIG. 5, the word " мороженое " is referred to as the homonym 516. As an example, a homonym word pattern associated with " мороженое " may comprise " держал " (i.e., one word before) and " в " (i.e., one word after). In some embodiments, the homonym word pattern may comprise the homonym word to form the following homonym word pattern " держал "-" мороженое "-" в ".

As an example, the server 222 may determine the first context element associated with the word " держал " as being "Verb_past_tense". The homonym context pattern 522 comprises two context elements and an indication that the homonym is a homonym. The homonym context pattern 522 may therefore recite "Verb_past_tense-Homonym-Preposition". Turning now to the first sentence used in that example to determine the lexical tag to be assigned to the homonym 516, the collection of words used by the server 222 may be "Она ", " вставила ", " заглушку ", " в " and " розетку ". From this collection of words, the server 222 may determine, for example based on the dictionary entry 504, that the word " заглушку " is a non-homonym as it is associated with only one lexical tag, the lexical tag 514 corresponding to "Noun". In the example illustrated at FIG. 5, the word " заглушку " is referred to as the non-homonym 518. Still pursuing with this example, a context pattern associated with the non-homonym " заглушку " may comprise one or more context elements such as the context element "Verb_past_tense" associated with the word " вставила ".

As an example, the non-homonym context pattern 524 is generated. The non-homonym context pattern 524 comprises two context elements and an indication that the non-homonym is a non-homonym. The non-homonym context pattern 524 therefore recites "Verb_past_tense-Non_Homonym-Preposition". In an embodiment, the non-homonym context pattern 524 is associated with the non-homonym—i.e., the word " заглушку ". Then, because the non-homonym context pattern 524 matches the homonym context pattern 522, the server 222 may assign the lexical tag 514 (i.e., "Noun") to the homonym 516. As a result, the server 222 may identify a meaning of the homonym 516 which is most likely relevant to the context of the homonym.

Figure 6:
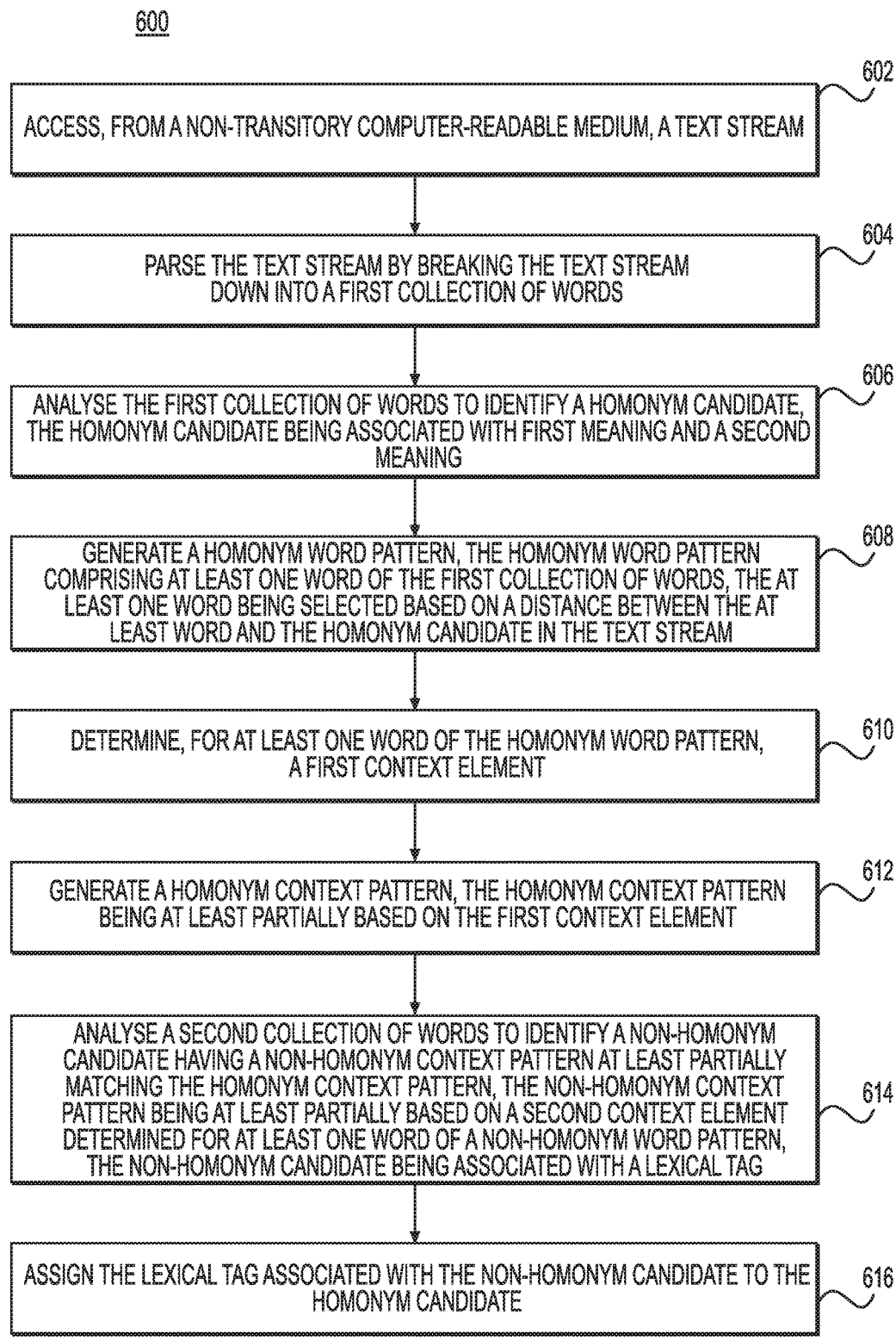
FIG. 6 is a flowchart illustrating a computer-implemented method implementing embodiments of the present technology.

Having described, with reference to FIG. 1 to FIG. 5, some non-limiting example instances of systems and computer-implemented methods used in connection with the problem of processing a text stream, we shall now describe a general solution to the problem raised by the presence of homonym word(s) with reference to FIG. 6.

More specifically, FIG. 6 shows a flowchart illustrating a computer-implemented method of 600 processing a text stream. The method 600 starts with step 602 wherein a text stream is accessed from a non-transitory computer-readable medium. In an embodiment, the text stream may be accessed from the corpus of text database 226, the dictionary database 224, the memories 120, 130 of the server 222 and/or the memories 120, 130 of the electronic device 208. The text stream may be a corpus of text. In some alternative embodiments, the method 600 also comprises accessing, from the non-transitory computer-readable medium, a second text stream. The second text stream may be accessed from the corpus of text database 226, the dictionary database 224, the memories 120, 130 of the server 222 and/or the memories 120, 130 of the electronic device 208. In some embodiments, the text stream and the second text stream may define a same text stream or distinct text streams. At step 604, the text stream may be parsed by breaking the text stream down into a first collection of words. In some alternative embodiments, the second text stream may be parsed by breaking the second text stream down to establish a second collection of words.

In some embodiments, the first collection of words and the second collection of words may define a same collection of words. In some other embodiments, the first collection of words and the second collection of words may define distinct collection of words.

The method 600 then proceeds to step 606 wherein the first collection of words may be analysed to identify a homonym candidate, the homonym candidate being associated with a first meaning and a second meaning. In some embodiments, analysing the first collection of words to identify the homonym candidate may be based on a comparison of each one of the words of the collection of words with entries of the dictionary database 224. In some other embodiments, analysing the first collection of words to identify the homonym candidate may comprise accessing, from the non-transitory computer-readable medium (120, 130), a dictionary database. In some embodiments, the homonym candidate may be identified upon determining that one of the entries of the dictionary database corresponding to the one of the words of the first collection of words is associated with a plurality of meanings including the first meaning and the second meaning. At step 608, the method 600 proceeds to generating a homonym word pattern, the homonym word pattern comprising at least one word of the first collection of words, the at least one word being selected based on a distance between the at least one word and the homonym candidate in the text stream. In some embodiments, the distance may be a number of words separating the at least one word of the first collection of words from the homonym candidate in the text stream. In some embodiments, the distance may be pre-defined as being one word before the homonym candidate, two words before the homonym candidate, three words before the homonym candidate, one word after the homonym candidate, two words after the homonym candidate and/or three words after the homonym candidate.

At step 610, the method 600 may determine, for at least one word of the homonym word pattern, a first context element. At step 612, the method 600 may generate a homonym context pattern, the homonym context pattern being at least partially based on the first context element. In some embodiments, generating the homonym context pattern is based on multiple context elements, each one of the multiple context elements being determined for the corresponding word of the homonym word pattern, the multiple context elements including the first context element.

At step 614, the method 600 may analyse a second collection of words to identify a non-homonym candidate having a non-homonym context pattern at least partially matching the homonym context pattern, the non-homonym context pattern being at least partially based on a second context element determined for at least one word of a non-homonym word pattern, the non-homonym candidate being associated with a lexical tag. In some embodiments, the first context element and the second context element may be an indication of a word form, an indication of a semantic characteristic and/or an indication of a grammatical characteristic. In some embodiments, the non-homonym pattern may comprise at least one word of the second collection of words, the at least one word being selected based on a distance between the at least one word and the non-homonym candidate. In some embodiments, the distance may be a number of words separating the at least one word of the second collection of words from the non-homonym candidate. In some embodiments, the distance may be pre-defined as being one word before the non-homonym candidate, two words before the non-homonym candidate, three words before the non-homonym candidate, one word after the non-homonym candidate, two words after the non-homonym candidate and/or three words after the non-homonym candidate. In some embodiments, identification of the non-homonym candidate may comprise determining that the second context element of the non-homonym context pattern is similar to the first context element of the homonym context pattern. In some embodiments, the lexical tag may define an indication of a word form, an indication of a semantic characteristic and/or an indication of a grammatical characteristic. In some embodiments, the non-homonym candidate may be associated with a unique meaning.

At step 616, the method 600 may assign the lexical tag associated with the non-homonym candidate to the homonym candidate. In some embodiments, the method 600 may comprise determining which one of the first meaning and the second meaning of the homonym candidate is to be retained based on the lexical tag assigned to the homonym candidate. In some embodiments of the method 600, determining which one of the first meaning and the second meaning of the homonym candidate is to be retained may be completed without having to access to a training corpus of text manually tagged. In yet some other embodiments, the method 600 may determine which one of the first meaning and the second meaning of the homonym candidate is to be retained based on the lexical tag associated with the non-homonym candidate without assigning the lexical tag to the homonym candidate.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

One skilled in the art will appreciate when the instant description refers to "receiving data" from a user that the electronic device 208 or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of processing a first text stream for execution by a processor, the method comprising:
accessing, from a non-transitory computer-readable medium, the first text stream;
parsing the first text stream by breaking the first text stream down into a first collection of words;
analysing the first collection of words to identify a homonym candidate, the homonym candidate being associated with a first meaning and a second meaning;
generating a homonym word pattern, the homonym word pattern comprising at least one word of the first collection of words, the at least one word being selected based on a distance between the at least one word and the homonym candidate in the first text stream, the distance being a number of words separating the at least one word of the first collection of words from the homonym candidate in the first text stream;
determining, for at least one word of the homonym word pattern, a first context element;
generating a homonym context pattern, the homonym context pattern being at least partially based on the first context element;
parsing a second text stream by breaking the second text stream down into a second collection of words, the second collection of words being distinct from the first collection of words, the second text stream being in a same language as the first text stream;
analysing the second collection of words to identify a non-homonym candidate, the non-homonym candidate being associated with a lexical tag;
if a non-homonym context pattern at least partially matches the homonym context pattern, the non-homonym context pattern being at least partially based on a second context element determined for at least one word of a non-homonym word pattern,
assigning the lexical tag associated with the non-homonym candidate to the homonym candidate;
storing, to a memory coupled to the processor, the lexical tag; and
rendering the lexical tag on a display of an electronic device.

2. The method of claim 1, wherein analysing the first collection of words to identify the homonym candidate is based on a comparison of each one of the words of the first collection of words with entries of a dictionary database.

3. The method of claim 2, wherein analysing the first collection of words to identify the homonym candidate comprises accessing, from the non-transitory computer-readable medium, the dictionary database.

4. The method of claim 2, wherein the homonym candidate is identified upon determining that one of the entries of the dictionary database corresponding to the one of the words of the first collection of words is associated with a plurality of meanings including the first meaning and the second meaning.

5. The method of claim 1, wherein the distance is predefined as being at least one of one word before the homonym candidate, two words before the homonym candidate, three words before the homonym candidate, one word after the homonym candidate, two words after the homonym candidate and three words after the homonym candidate.

6. The method of claim 1, wherein the first context element and the second context element are at least one of an indication of a word form, an indication of a semantic characteristic and an indication of a grammatical characteristic.

7. The method of claim 1, wherein generating the homonym context pattern is based on multiple context elements, each one of the multiple context elements being determined for the corresponding word of the homonym word pattern, the multiple context elements including the first context element.

8. The method of claim 1, wherein identification of the non-homonym candidate comprises determining that the second context element of the non-homonym context pattern is similar to the first context element of the homonym context pattern.

9. The method of claim 1, wherein the lexical tag defines at least one of an indication of a word form, an indication of a semantic characteristic and an indication of a grammatical characteristic.

10. The method of claim 1, wherein the non-homonym candidate is associated with a unique meaning.

11. The method of claim 1, wherein the method further comprises determining which one of the first meaning and the second meaning of the homonym candidate is to be retained based on the lexical tag assigned to the homonym candidate.

12. The method of claim 1, wherein determining which one of the first meaning and the second meaning of the homonym candidate is to be retained is completed without having to access to a training corpus of text manually tagged.

13. The method of claim 1, wherein the first text stream is a corpus of text.

14. A computer-implemented method of processing a first text stream for execution by a processor, the method comprising:
accessing, from a non-transitory computer-readable medium, the first text stream;
parsing the first text stream by breaking the first text stream down into a first collection of words;
analysing the first collection of words to identify a homonym candidate, the homonym candidate being associated with a first meaning and a second meaning;
generating a homonym word pattern, the homonym word pattern comprising at least one word of the collection of words, the at least one word being selected based on a distance between the at least one word and the homonym candidate in the first text stream, the distance being a number of words separating the at least one word of the first collection of words from the homonym candidate in the first text stream;
determining, for at least one word of the homonym word pattern, a first context element;
generating a homonym context pattern, the homonym context pattern being at least partially based on the first context element;
parsing a second text stream by breaking the second text stream down into a second collection of words, the second collection of words being distinct from the first collection of words, the second text stream being in a same language as the first text stream;
analysing the second collection of words to identify a non-homonym candidate, the non-homonym candidate being associated with a lexical tag;
if a non-homonym context pattern at least partially matches the homonym context pattern, the non-homonym context pattern being at least partially based on a second context element determined for at least one word of a non-homonym word pattern,
  determining which one of the first meaning and the second meaning of the homonym candidate is to be retained based on the lexical tag associated with the non-homonym candidate; and
rendering a retained meaning on a display of an electronic device.

15. A computer-implemented system for processing a first text stream, the system comprising:
  a non-transitory computer-readable medium;
  a processor configured to perform:
    accessing, from the non-transitory computer-readable medium, the first text stream;
    parsing the first text stream by breaking the first text stream down into a first collection of words;
    analysing the first collection of words to identify a homonym candidate, the homonym candidate being associated with a first meaning and a second meaning;
    generating a homonym word pattern, the homonym word pattern comprising at least one word of the first collection of words, the at least one word being selected based on a distance between the at least one word and the homonym candidate in the first text stream, the distance being a number of words separating the at least one word of the first collection of words from the homonym candidate in the first text stream;
    determining, for at least one word of the homonym word pattern, a first context element;
    generating a homonym context pattern, the homonym context pattern being at least partially based on the first context element;
    parsing a second text stream by breaking the second text stream down into a second collection of words, the second collection of words being distinct from the first collection of words, the second text stream being in a same language as the first text stream;
    analysing the second collection of words to identify a non-homonym candidate, the non-homonym candidate being associated with a lexical tag;
    if a non-homonym context pattern at least partially matches the homonym context pattern, the non-homonym context pattern being at least partially based on a second context element determined for at least one word of a non-homonym word pattern,
      assigning the lexical tag associated with the non-homonym candidate to the homonym candidate; and
    storing, to a memory coupled to the processor, the lexical tag assigned to the homonym candidate.

16. The system of claim 15, wherein analysing the first collection of words to identify the homonym candidate is based on a comparison of each one of the words of the first collection of words with entries of a dictionary database.

17. The system of claim 16, wherein analysing the first collection of words to identify the homonym candidate comprises accessing, from the non-transitory computer-readable medium, the dictionary database.

18. The system of claim 16, wherein the homonym candidate is identified upon determining that one of the entries of the dictionary database corresponding to the one of the words of the first collection of words is associated with a plurality of meanings including the first meaning and the second meaning.

\* \* \* \* \*